United States Patent [19]
Spooner et al.

[11] Patent Number: 5,844,341
[45] Date of Patent: Dec. 1, 1998

[54] ELECTROMAGNETIC MACHINE WITH AT LEAST ONE PAIR OF CONCENTRIC RINGS HAVING MODULARIZED MAGNETS AND YOKES

[75] Inventors: Edward Spooner, Durham; Alan Charles Williamson, Timperley, both of United Kingdom

[73] Assignee: AEA Technology plc, Didcot, United Kingdom

[21] Appl. No.: 826,634

[22] Filed: Apr. 2, 1997

Related U.S. Application Data

[63] Continuation of Ser. No. 247,258, May 23, 1994, abandoned.

[30] Foreign Application Priority Data

Jun. 3, 1993 [GB] United Kingdom ................... 9311634

[51] Int. Cl.⁶ ............................ H02K 7/20; H02K 17/44
[52] U.S. Cl. ......................... 310/112; 310/114; 310/156; 310/187; 310/216
[58] Field of Search .................... 310/112, 114, 310/156, 187, 216

[56] References Cited

U.S. PATENT DOCUMENTS

| | | | |
|---|---|---|---|
| 2,006,172 | 6/1935 | Klappauf | 310/112 |
| 4,291,235 | 9/1981 | Berger et al. | 290/55 |
| 4,476,395 | 10/1984 | Cronin | 290/6 |
| 4,613,779 | 9/1986 | Meyer | 310/112 |
| 4,691,133 | 9/1987 | Mongeau | 310/178 |
| 4,866,321 | 9/1989 | Blanchard et al. | 310/112 |
| 4,973,386 | 11/1990 | Wust | 310/51 |
| 5,177,388 | 1/1993 | Hotta et al. | 310/114 |
| 5,258,697 | 11/1993 | Ford et al. | 318/498 |

FOREIGN PATENT DOCUMENTS

| | | | |
|---|---|---|---|
| 2636280 | 3/1990 | France | 310/112 |

*Primary Examiner*—Steven L. Stephan
*Assistant Examiner*—Elvin G. Enad
*Attorney, Agent, or Firm*—D. Peter Hochberg; William H. Holt; William R. Hinds

[57] ABSTRACT

An electromagnetic machine which is suitable for use as a direct-drive, directly-coupled, mains electricity generator (14) to be driven by a low speed device such as a wind turbine (18), consists of one or more rotor rings (30) of many permanent magnets (40) of alternating polarity, with coaxial stator rings (28) of many laminated yokes (35), each yoke defining slots to locate coils (38). The yokes (35) and coils (38) form modules which are supported by beams (32) relative to the rotor rings (30). The rotor rings (30) may also be of modular construction. Manufacture and assembly are thereby simplified, and sub-harmonic magnetic flux components are suppressed.

11 Claims, 2 Drawing Sheets

ELECTROMAGNETIC MACHINE WITH AT LEAST ONE PAIR OF CONCENTRIC RINGS HAVING MODULARIZED MAGNETS AND YOKES

This is a continuation of application Ser. No. 08/247,258 filed May 23, 1994 now abandoned.

This invention relates to an electromagnetic machine, primarily intended to act as a generator of electricity, but which could equally be used as an electric motor.

The machine of the invention is primarily intended as a generator of mains-frequency alternating current when directly coupled to a device such as a wind-energy rotor, which rotates at a much lower frequency than mains frequency. It may equally be used to generate current at other frequencies for use with systems where the generator feeds into the mains via a frequency convertor. Hitherto it has usually been necessary to interpose a gear-mechanism between such a rotor (which might rotate at 40 r.p.m.) and a generator of conventional type, so the generator turns much faster than the rotor. The use of permanent magnets to provide the magnetic field in which one or more coils are moved to generate electricity is also known. For example P. Zielinska and K. Schoep, in an article in Proceedings of International Conference on Electrical Machines, UMIST 1992, describe a three-phase, permanent magnet, synchronous machine; a laminated rotor with fourteen permanent magnets arranged with alternating polarity around its perimeter is rotatable within a tubular stator with six coils locating in respective pairs of longitudinal slots along its bore. Diametrically opposite coils are associated with the same phase, and the three phases are said to be practically decoupled.

According to the present invention there is provided an electromagnetic machine comprising one or more pairs of rings arranged on a common axis, in the or each pair the first ring comprising several permanent magnets arranged so there are magnetic poles alternating in polarity around the ring at the surface thereof facing the second ring, and the second ring comprising several laminated yokes, each yoke defining at least one pair of slots in the surface thereof facing the first ring, rectangular coils of wire locating in pairs of adjacent slots, and one of the rings being rotatable relative to the other, the slots extending transverse to the direction of relative motion of the adjacent poles.

The first and the second rings of each pair are preferably concentric. The or each second ring is modular, and can be assembled from the yokes and the associated coils in the desired position relative to the first ring, which in view of the magnetic forces between the rings is considerably easier than sliding one complete ring inside the other, if the rings are concentric. Preferably the first ring is a rotor, and the second ring is a stator, as it is then simpler to make electrical contact with the coils. However the alternative arrangement (with the second ring as the rotor) may be used, if slip-ring connections to the coils are acceptable.

Preferably each yoke is of E-shaped cross-section and locates a single coil. Each yoke is desirably supported by a beam extending parallel to the axis between support members at the ends of the machine. The preferred machine comprises a plurality of pairs of rings arranged end to end on a common axis, and each support beam can support one yoke from each of the second rings; the number of support beams is thus equal to the number of yokes in a single second ring.

The or each first ring may also be of modular construction, comprising several permanent magnets and pole pieces. The preferred embodiment uses rectangular ferrite magnets with tapered pole pieces which project beyond the side of the magnet along one edge to define a protruding pole at the surface of the ring. An alternative design would comprise a steel cylinder on the surface of which are mounted several magnets, alternating in polarity around the ring and spaced apart from each other.

The rate of rotation of the rotor, and the number of magnetic poles around a first ring, together determine the frequency of the generated emf. For example if the rotor rotates at 42.3 r.p.m. and there are 142 poles (of alternating polarity), the generated emf will be at 50 Hz. The number of poles must therefore be chosen in accordance with the expected rate of rotation in order to generate an emf at a desired frequency.

Where the machine is a generator the outputs from the coils may be rectified, and if the rate of rotation is variable this may be preferable because the rectified, dc output can then be inverted to give fixed frequency ac. Each coil may be provided with a rectifier, for example a bridge rectifier, or alternatively sets of coils may be connected together in series and the output of each set rectified. Alternatively the coils may be interconnected to provide alternating outputs, for example a three-phase output, with several coils being associated with each phase. The number of poles in a ring is preferably at least 24, and for a machine connected to a wind rotor there are preferably at least 100 poles.

The emfs generated in different coils will generally be of different phases, but the coils can be connected to provide a three phase output. The number of slots is desirably kept as small as practicable (in any one pair of rings) in order to minimise the cost of coil construction and of assembly of the machine and to allow each slot to be of sufficient width to accommodate adequate electrical insulation as well as the coil. The number, q, of slots per pole per phase is typically between 2 and 8 in conventional machines. If such a q value were used in the present machine with, for example 142 poles, then the number of slots would be at least 852 which would be impractical. Using a much smaller value of q, of say 0.3 to 0.4 (i.e. a smaller number, say 156, of slots in each ring), leads to a much lower construction cost and slots of satisfactory width but gives rise to subharmonic components of magnetic flux. With a low value of q the individual coils of the winding are physically separated and do not overlap. This makes it possible to split the stator into a number of modules as described below. For example a first ring might have 142 poles, and the second ring define 156 slots in which 78 coils locate. The q value for the machine, that is the number of slots per pole per phase, is therefore 0.366. This is a much smaller q value than for conventional generators.

One consequence of the large number of poles in each first ring is that the magnetic flux paths within the second ring are localised. The yokes may therefore be spaced slightly apart by non-magnetic material without causing much disturbance to the flux. Hence the yokes may be of E-shape, with a flat surface in which the slots are defined (so the surface of the second ring facing the magnet poles is actually polygonal). Such E-shaped yokes can therefore be assembled to make machines of a range of different diameters, standardised E-shaped yokes being used in every case. There may also be narrow gaps between adjacent pole pieces in the first ring. This makes assembly of each first ring easier, and also introduces a significant extra reluctance into the magnetic path for any sub-harmonic components of magnetic flux. The pairs of first and second rings are desirably spaced apart along the axis as this introduces further reluctance for sub-harmonic flux components. The modular nature of the first and the second rings simplifies both manufacture of the components and their assembly.

In operation of the machine, whether as a generator or as a motor, heat will be generated in the coils (due to Joule heating), and a smaller amount of heat will be generated in the iron laminations of the yokes (due to hysteresis). It is thus apparent that means may be required to cool the second ring. In a preferred embodiment the beams which support the yokes are in good thermal contact with the yokes, the beams are hollow, and fans are used to cause a flow of air through each beam to cool the beam and so the yokes and the coils.

In operation the machine will also tend to produce acoustic noise. This may be due to variations in the radial magnetic forces between the rotor and the stator; variations in the tangential forces on the rotor and stator poles during rotation; non-synchronous current distributions in the coils; and imbalance between the loads on the three output phases. In a machine with a plurality of first rings on a common axis of rotation, along with a plurality of second rings whose yokes are supported by common beams, many of the noise-generating forces can be cancelled by displacing the first rings angularly relative to each other so the alternating components of the forces cancel out. There may still be some residual elastic deformation in the beams, so clearly these must be stiff in both deflection and torsion. It is also desirable to damp any residual vibrations, for example by partly filling hollow beams with sound-absorbing material, or by inserting damping material such as rubber between adjacent beams.

Where the electric machine is used as a generator connected to the mains, damping is required to overcome the tendency of a synchronous machine to hunt around its equilibrium load angle. Desirably such damping is provided by allowing the stator to turn with respect to the supporting structure, and mechanically limiting and damping that turning motion. The damping may be provided by oil-filled dashpots, by the friction in leaf springs, or alternatively by rubber mountings made of high hysteresis rubber. The spring stiffness in the torque reaction system should be low enough to allow the stator to turn through an angle of several degrees, preferably an angle equivalent to the angular separation of a plurality of adjacent poles, for example two or three poles, or even as much as ten or more poles.

In order to avoid excessive transient torque and current when the generator is first connected to the mains supply, the generated emf should of course be as close as possible to the mains in magnitude, phase, and frequency. If they are not perfectly matched then a transient current will flow, causing a transient torque which will tend to change the relative angular velocity of the rotor and stator towards synchronous speed. If the generator is damped as described above, then the stator will turn against the elastic compliance of the torque reaction system, and the generator will become synchronised with the mains.

The invention will now be further described by way of example only and with reference to the accompanying drawings in which.

Figure 1:
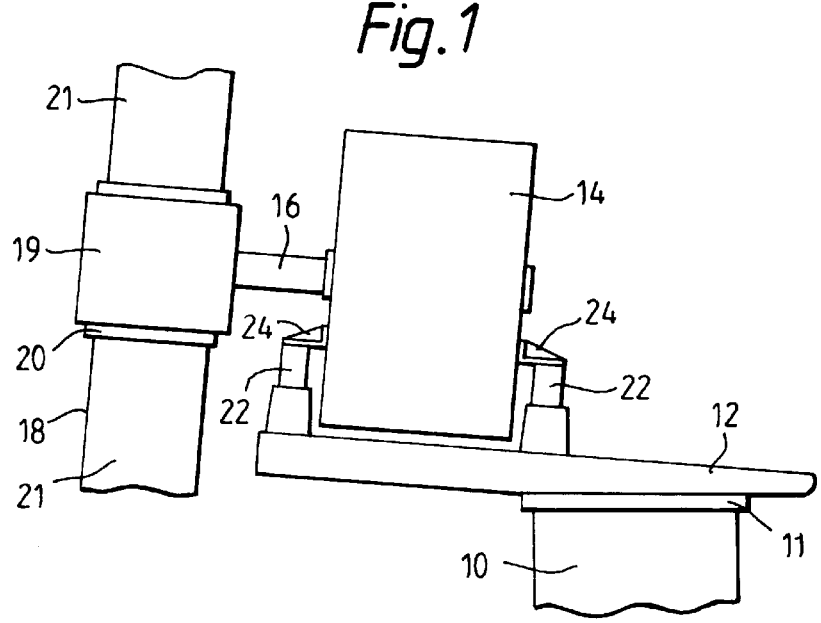
FIG. 1 shows a side view of a wind turbine incorporating a direct drive generator.

Referring to FIG. 1, at the top of a tower 10 is a yaw bearing 11 which supports a pallet 12. The pallet 12 supports a generator 14 which is connected by a short shaft 16 to a wind rotor 18 with a teetering hub 19, pitch bearings 20, and blades 21. The generator 14 is of generally cylindrical form with a rotor inside a stator; the stator has circular end plates 31 (shown in FIG. 2), and the generator 14 is supported by two pairs of rubber springs 22 connected to the end plates 31 by brackets 24, the springs 22 of each pair being on opposite sides of the vertical plane in which the axis of the shaft 16 lies (only two springs 22 are shown in FIG. 1). The tower 10, bearing 11, and pallet 12 and the wind rotor assembly 18, 19, 20, 21 are of known types, and are not the subject of the invention. By way of example the wind rotor 18 might be of diameter 35.6 m, and for a wind speed of 12 m/s be expected to rotate at 42.5 r.p.m. giving a power output of about 400 kW.

Figure 2:
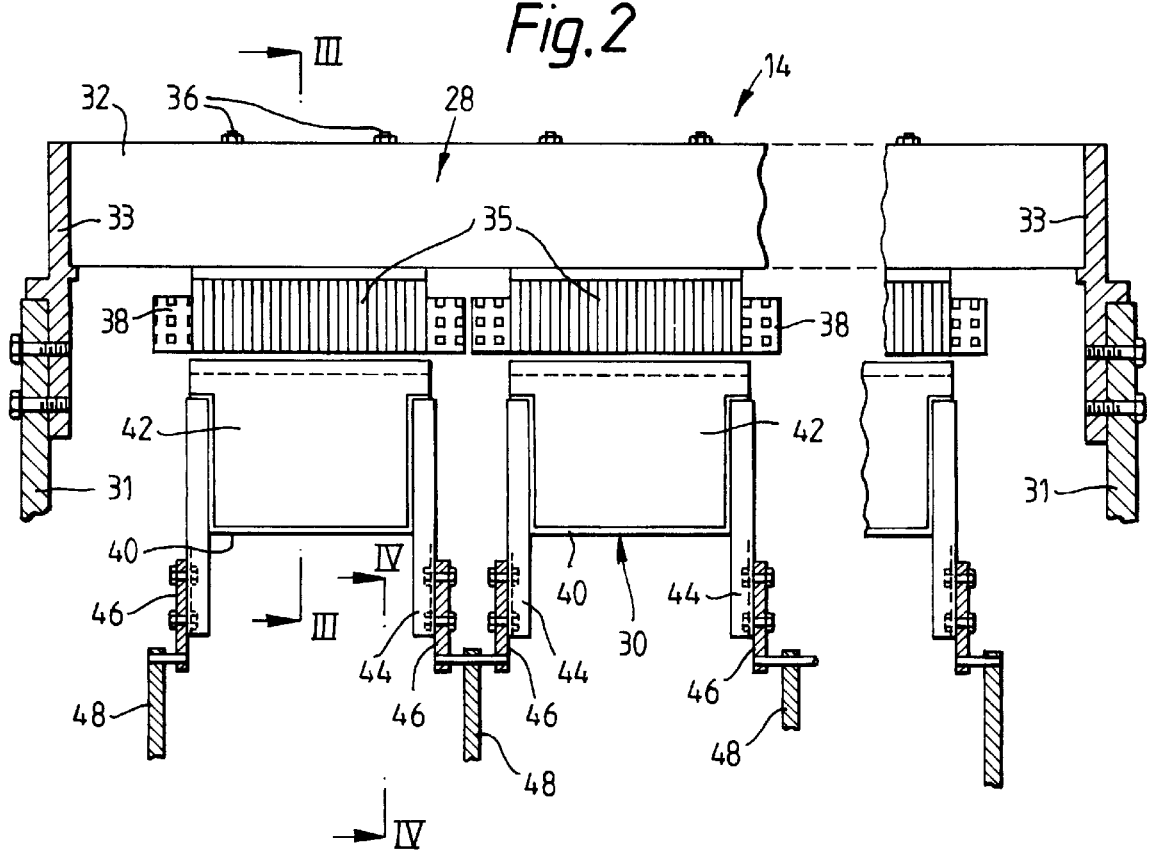
FIG. 2 shows a longitudinal sectional view of the generator of FIG. 1.
Figure 3:
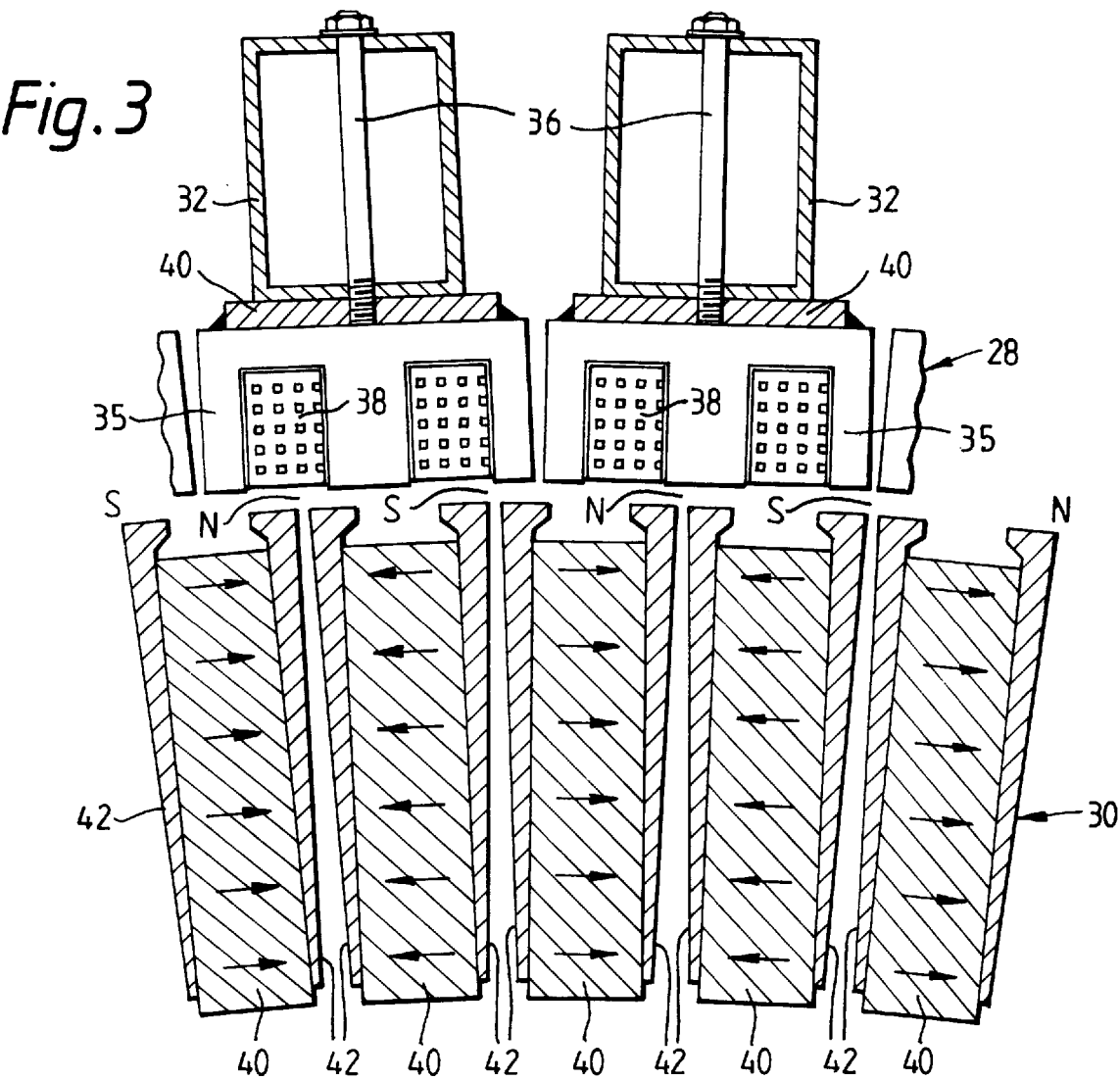
FIG. 3 shows a sectional view on the line III—III of FIG. 2.

Referring now to FIG. 2, the generator 14 comprises a stator 28 and a rotor 30. The stator 28 consists of two circular end plates 31 and seventy-eight longitudinally-extending hollow rectangular steel beams 32, each beam 32 being connected to the periphery of each end plate 31 by end caps 33. Each beam 32 is of cross-section 75 mm by 50 mm, with 4 mm thick walls. Five yokes 35 (only two are shown in full) are fixed by bolts 36 to each beam 32. Each yoke 35 is of laminated iron, of length 150 mm, and of E-shaped cross-section so as to define two longitudinal slots 20 mm wide which locate a rectangular coil 38 of thirty-six turns of insulated, 2.5 mm diameter copper wire on a bobbin, taped and resin-impregnated. Referring also to FIG. 3, each yoke 35 is welded to a steel back-plate 40, to which the bolt 36 is attached. There is a narrow gap between adjacent yokes 35 around the circumference of the stator 28. The stator 28 thus consists of five rings spaced apart along an axis, each ring consisting of seventy-eight E-shaped yokes 35, so the inner surface of each ring is in fact polygonal.

Figure 4:
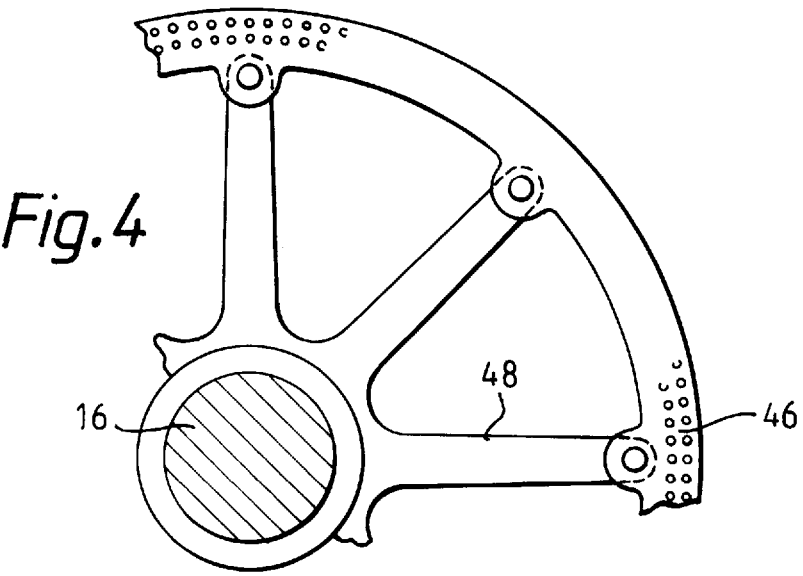
FIG. 4 shows a sectional view on the line IV—IV of FIG. 2.

Referring again to FIG. 2, the rotor 30 consists of five rings, each ring consisting of 142 rectangular ferrite magnets 40 (only two are shown in full) each with two tapered pole pieces 42 on either side which project above the radially outermost surface of the magnets 40. Each magnet 40 is 150 mm long. Non-magnetic fixing brackets 44 are attached to the ends of each magnet 40 and are bolted onto a ring 46 which is also preferably non-magnetic. Referring also to FIG. 4, all the rings 46 are connected by rotor spiders 48 to the shaft 16, to which the spiders 48 are clamped by taper hubs. Referring also to FIG. 3, the magnets 40 are arranged alternating in polarity around each ring, so that the projecting pairs of ends of the pole pieces 42 also alternate in polarity. There is a narrow gap between adjacent magnet pole pieces 42 around the circumference of the rotor 30. The rotor 30 has a diameter of 1.8 m, and there is a radial gap of width 2.5 mm between the outer ends of the pole pieces 42 and the inner surface of the stator 28.

In operation the wind rotor 18 causes the rotor 30 of the generator 14 to rotate within the stator 28. As the alternating polarity pole pieces 42 pass the coils 38 they induce alternating emf in the coils 38. The difference in phase between the emf in adjacent coils 38 is:

$$\phi = 180° \times \frac{142}{78} = 327.7°$$

If the phases of the emfs of all the coils 38 in a ring are displayed in a phasor diagram, they are uniformly distributed. All the coils with phase between 0° and 60° are connected in series (set A); those with phase between 60° and 120° are connected in series (set B); those with phase between 120° and 180° are connected in series (set C); those with phase between 180° and 240° are connected in series (set D); et cetera. Set D can then be connected in reverse, in series with set A; and similarly for the other phase sets. Alternatively, because in this embodiment each set consists of the same number (thirteen) of coils 38, sets such as A and D (in reverse) can be connected in parallel to give a lower output voltage.

The induced emf of each coil (at the rate of rotation of 42.3 r.p.m.) is about 45 V; the voltage across each set of thirteen coils is about 560 V, taking into account the spread of phases. The generator 14 has five such rings of yokes 35 and coils 38, so there are ten such sets of coils which may be connected in a variety of different arrangements to give different output voltages.

The generator 14 can be connected into a mains grid, and the resilience in the rubber mountings 22 for the stator 28 is sufficient to allow the stator 28 to turn in response to the transient torque when initially connected, and then to come into synchronism with the mains frequency. It may be desirable to be able to adjust the induced emf produced by the generator 14, firstly for synchronising to the supply, and secondly for reactive power control. This can be achieved by displacing the rotor 30 axially relative to the stator 28, so modifying the magnetic coupling. This will affect both the emf and the reactances. An alternative way of adjusting the reactive power would be to change the number of coils 38 in each set (A, B, C, etc) which are connected in series to provide the output voltage (so some of the coils 38 are not used). The resulting asymmetry may however cause more acoustic noise to be generated.

When it is desired to stop rotation of the wind rotor 18 and the generator rotor 30, either for routine or for emergency shutdown, the braking may make use of the emf generated by the generator 14. One or each of the output phases could be connected to earth via a capacitor in parallel with a resistor. For example this might use a 0.4 ohm resistor in parallel with a 1 mF capacitor to brake down to about 10 r.p.m. At lower speeds the capacitor would have little effect and the most effective braking would then be achieved by short-circuiting the generator.

It will be appreciated that the electrical machine described above may be modified in various ways while remaining within the scope of the invention. For example the end caps 33 might define apertures within which electrically-driven fans are installed so a flow of coolant air flows along each hollow beam 32 to remove heat from the coils 38 and yokes 35. The yokes 35 and the magnet modules might be a different length, for example they might both be of length 300 mm, each magnet module comprising two ferrite magnets 40 sandwiched end-to-end between 300 mm-long pole pieces. This will slightly reduce leakage of flux at the ends of the modules. Each yoke might define a different number of slots, for example each yoke might define four longitudinal slots so as to locate two coils 38 (so each yoke replaces two adjacent yokes 35 of the generator 14). Furthermore the face of the yoke in which the slots are defined might be curved, so the inner surface of the ring is closer to being cylindrical. The generator 14 might be driven by the wind rotor 18 in a different fashion, for example the generator 14 might itself form the hub of the wind rotor. Where the hub incorporates the generator, the ring of magnets may be either inside or outside the ring of yokes.

We claim:

1. An electromagnetic machine comprising one or more pairs of concentric rings arranged on a common axis, each pair of concentric rings having a modular first ring and a concentric modular second ring, said first ring and said second ring having opposing first and second surfaces separated by a gap wherein:

said first ring comprises magnet modules separated by circumferential gaps from adjacent magnet modules, each of said magnet modules comprising a permanent magnet and two pole pieces, one of said pole pieces being on one side of said permanent magnet and the other of said pole pieces being on the other side of said permanent magnet, wherein each of said pole pieces has a side facing one of the circumferential gaps opposite a side facing the permanent magnet, each magnet being magnetized in a tangential direction transverse to said common axis, the polarity of the magnets being such that there are magnetic poles alternating in polarity around said first ring at said first surface, the magnetization of the permanent magnet in a said magnet module being oppositely directed to the magnetization of the permanent magnets in both of the adjacent magnet modules; and said second ring comprises several laminated yokes, each yoke defining at least one pair of slots in said second surface, said slots extending parallel to said common axis, rectangular coils of wire located in pairs of adjacent slots, said yoke and said coils in said yoke defining a yoke module separated by circumferential gaps from adjacent yoke modules;

wherein one of said first and second rings of each of said one or more concentric pairs being continuously rotatable relative to the other of said first and second rings about said common axis.

2. The machine as claimed in claim 1 wherein each yoke is of E-shaped cross-section, defining parallel-sided slots, and locates a single coil.

3. The machine as claimed in claim 1 wherein the number of slots in any one second ring is at least as many as the number of magnetic poles in the corresponding first ring.

4. The machine as claimed in claim 3 wherein the number of slots and the number of poles are both at least 100.

5. The machine as claimed in claim 1 wherein, in the or each second ring, the emfs induced in the coils are of different phases, and the coils are connected so as to provide three-phase alternating outputs, there being several coils in each second ring associated with each phase of the outputs.

6. The machine as claimed in claim 1 wherein, in the or each pair of rings, the number of coils and the number of poles are such that in operation the emfs induced in the coils by the magnets are not all co-phasal.

7. The machine as claimed in claim 1 wherein each pole piece of each of said magnet modules projects radially, such that the surface of the pole pieces are closer to the second surface than the surface of the permanent magnet of the same magnet module.

8. The machine as claimed in claim 1 wherein at least one of the one or more pairs of concentric rings has the first ring axially movable relative to the second ring.

9. The machine as claimed in claim 1 wherein, in said one or more pairs of concentric rings in which one of said first and second rings is continuously rotatable relative to the other, the other ring of each concentric pair can undergo limited rotation, through less than half a revolution, and the machine includes means to apply a torque and damping to oppose this limited rotation.

10. The machine as claimed in claim 1 wherein means are provided to cool each yoke module at the surface thereof remote from the first ring.

11. An electromagnetic generator comprising one or more pairs of concentric rings arranged on a common axis, each of the rings in the one or more pairs being of modular construction and having the following features:

(a) the first ring comprising several magnet modules separated by circumferential gaps from adjacent magnet modules, each of said magnet modules comprising a permanent magnet and two radially projecting pole pieces wherein the permanent magnet is located between the pole pieces, each magnet being magnetized in a tangential direction transverse to said common axis, each permanent magnet in one of said magnet modules having a different polarity than both of the permanent magnets in adjacent magnet modules;

(b) the second ring comprising several laminated yokes, each yoke defining at least one pair of parallel-sided slots in a surface thereof facing the first ring, the slots extending parallel to the axis, and rectangular coils of wire locating in pairs of adjacent slots, each yoke with its coil or coils defining a yoke module, and each yoke module being separated by circumferential gaps from adjacent yoke modules;

(c) the first ring being rotatable about the axis; and (d) the number of coils and the number of poles are such that in operation the emf induced in every coil in the second ring is of a different phase;

wherein the first ring in at least one of the one or more pairs of concentric rings are axially displaceable relative to the second ring.

* * * * *

UNITED STATES PATENT AND TRADEMARK OFFICE
CERTIFICATE OF CORRECTION

PATENT NO. : 5,844,341
DATED      : December 1, 1998
INVENTOR(S) : Edward Spooner and Alan Charles Williamson It is certified that error appears in the above-indentified patent and that said Letters Patent is hereby corrected as shown below:

On the title page, item [73] Assign should read as follows:

The Secretary of State for Trade and Industry in Her Britannic Majesty's Government of the United Kingdom of Great Britain and Northern Ireland, London, United Kingdom Signed and Sealed this Ninth Day of November, 1999

*Attest:*

Q. TODD DICKINSON

*Attesting Officer*  Acting Commissioner of Patents and Trademarks